United States Patent [19]

Tokunaga et al.

[11] Patent Number: 4,686,269
[45] Date of Patent: Aug. 11, 1987

[54] PACKING MATERIAL FOR LIQUID CHROMATOGRAPHY AND METHOD FOR THE PREPARATION THEREOF

[75] Inventors: Kuniyuki Tokunaga, Tokuyama; Tsutomu Hashimoto, Kawasaki, both of Japan

[73] Assignee: Toyo Soda Manufacturing Co., Ltd., Shin Nanyo, Japan

[21] Appl. No.: 813,425

[22] Filed: Dec. 26, 1985

[30] Foreign Application Priority Data

Dec. 27, 1984 [JP] Japan .................................. 59-274013

[51] Int. Cl.$^4$ .............................................. C08F 12/36
[52] U.S. Cl. .................................... 526/336; 428/402; 521/38
[58] Field of Search ...................... 428/402; 526/336; 521/31, 38

[56] References Cited

U.S. PATENT DOCUMENTS

| | | | |
|---|---|---|---|
| 3,627,708 | 12/1971 | Morse | 526/336 |
| 4,174,430 | 11/1979 | Kido | 526/336 |
| 4,338,404 | 7/1982 | Tanaka | 526/336 |
| 4,485,207 | 11/1984 | Bates | 526/336 |

*Primary Examiner*—Paul R. Michl
*Attorney, Agent, or Firm*—Oblon, Fisher, Spivak, McClelland, & Maier

[57] ABSTRACT

A packing material for liquid chromatography comprising monovinyl aromatic monomer and divinyl or polyvinyl aromatic monomer is disclosed, wherein, in gel permeation chromatography, exclusion limit molecular weight is not less than $1 \times 10^3$ in terms of standard polystyrene, average particle diameter lies within a rage of 0.5 to 50 μm and the constitution rate of divinyl or polyvinyl aromatic monomer in copolymer particles is not less than 60% by weight, and a method for the preparation thereof is claimed, wherein suspension polymerization is carried out in a mixed aqueous solution containing organic colvent which dissolves whole monomer containing not less than 60% by weight of divinyl or polyvinyl aromatic monomer in whole monomer by amounts of 50 to 300% by weight of the solvent to both monomers and does not dissolve the copolymer of these monomers and radical polymerization initiator.

9 Claims, 8 Drawing Figures

⟶ Elusion Volume

F I G. 3
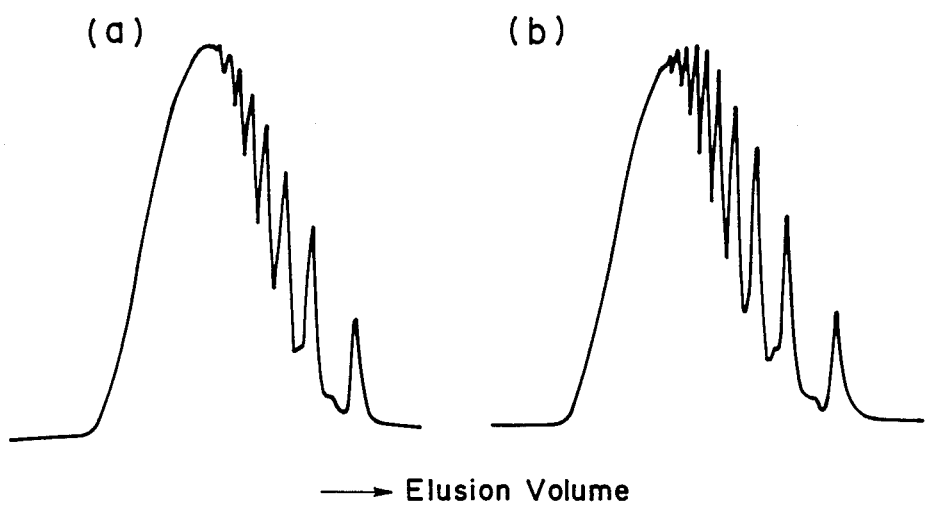
(a)　　　(b)
⟶ Elusion Volume
F I G. 4
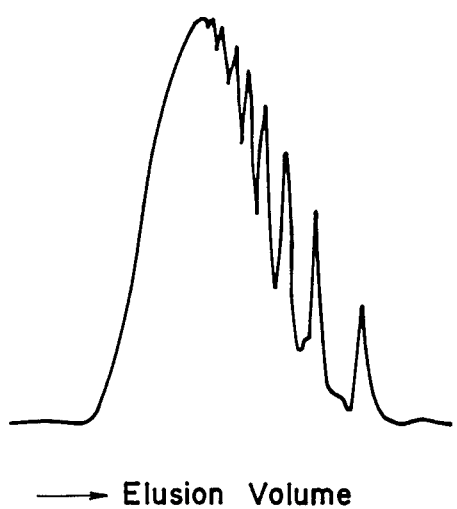
⟶ Elusion Volume (a)

(b)

⟶ Elusion Volume

→ Elusion Volume

PACKING MATERIAL FOR LIQUID CHROMATOGRAPHY AND METHOD FOR THE PREPARATION THEREOF

BACKGROUND OF THE INVENTION

The present invention relates to a packaging material for liquid chromatography, in particular, to a packing material for organic solvent type high spped gel permeation chromatography (abbreviated as GPC hereinafter) with high separation performance usable for the separation and the analysis of organic oligomer substances or organic polymer substances and a method for the preparation thereof. GPC is one of liquid chromatography wherein the sample is separated and eluted from the column one after another in order of the fraction with larger molecular weight or molecular size utilizing the principle that, when allowing the sample dissolved into the solvent to develop into the column packed with the packing material (abbreviated as gel hereinafter), the fraction with small molecular weight or molecular size permeates into the pores inside the gel resulting in the long retention time in the gel, whereas, on the contrary, the fraction with large molecular weight or molecular size does not permeate inside the gel but passes through outside of the gel.

And, this organic solvent type GPC has been used widely hitherto as a means for the separation and the analysis of high molecular compounds and oligomers placing many sorts of chemical industries such as petroleum chmistry, polymer chemistry, etc. in center. As the gel used for this GPC, styrene-divinylbenzene type copolymer particles are used widely in general since they are best in the point of overall performance.

The shortcoming of GPC up to this time lies in that sufficiently satisfied separation performance is not obtained compared with other liquid chromatography (adsorption and partition chromatography, ion-exchange chromatography, etc.). However, in case of GPC, the optimization to obtain the high separation performance cannot be aimed through the adjustment of elution conditions of mobile phase or the adjustment of adsorption capacity of stationary phase etc. as in cases of other liquid chromatography. Therefore, with GPC, in place of these, the contrivance to produce the high separation performance has been made by means of a method to lengthen the packing column, a method to decrease the flow rate of measurement, a recycle method to pass the substance to be separated through the column repeatedly and the like. However, with all these methods, a problem that the time for measurement is too long is existent. In particular, the requirement to speed up liquid chromatography more is strong recently and this is not exceptional also with organic solvent type GPC. For this reason, the development of excellent organic solvent type GPC which allows the high separation performance to be maintained in high-speed analysis and satisfys also the durability (stability) at the same time is desired strongly. Conventionally, as the method to make the high-speed analysis possible to some extent, there are a method to shorten the length of column and a method to raise the flow rate on measurement. However, in case of the former, though the total theoretical plate number becomes low and the speed up is attained, the separation performance becomes poor inversely. Moreover, in case of the latter, there are such problems as the separation performance becomes poor under the influences of mass transfer rate, diffusion velocity, etc., while there occur the obstructions on the durability of gel and the apparatus because of an increase in the pressure drop in column when the flow rate of measurement becomes high. Forthermore, as one of the methods to raise the separation performance, there is a method to lengthen the column in order to increase the total theoretical plate number. But, with this method, the speed up cannot be attained, through high separation performance is realized.

On the other hand, the preparation methods through the improvement in the pore volume of gel body or the distribution characteristic of pores, for example, (a) Improvement in the distribution characteristic of pores by enhancing the constitution rate of monovinyl aromatic monomer in whole monomer.

(b) Enlargement in the pore volume by increasing the amount of organic solvent in the mixture of whole monomer with organic solvent.

(c) Increase in the amount of polymerization initiator to an extent more than that used hitherto to whole monomer (for example, Japanese Patent Publication No. 59847/1982).

(d) Enhancement in the polymerization velocity by using the polymerization initiator with short half-life period (for example, Japanese Unexamined Patent Publication No. 84303/1980).

(e) Polymerization method to control the polymerization ratio to 85 to 98% (for example, Japanese Unexamined Patent Publication No. 69051/1980).

are proposed. However, all of these are methods to increase the amount of pore volume or fine pore volume of gel body. Therefore, although the high separation performance is attained to some extent, there is a room for the improvement in the points of mechanical strength, high-speed and durability. Further, by the methods disclosed in, for example, Japanese Unexamined Patent Publication No. 60290/1978, Japanese Unexamined Patent Publication No. 15132/1981. Japanese Unexamined Patent Publication No. 82963/1980, etc. the packing density may be increased to an extent not to make the separation performance poor, but there is still a room for the improvement in the separation performance.

Besides, there is a method to make the average particle diameter of gel small. But this method has a shortcoming that, when making the particles fine leaving as they have same separation performance as that hitherto, the pressure drop in the column becomes very high resulting in the insufficiency of the durability of gel and, if the mechanical strength of gel is insufficient, the packing of gel into the column becomes difficult and the reproducibility of packing becomes also poor resulting in that the column with the separation performance corresponding to the particle diameter is difficult to obtain.

Further, as the method to accomplish the improvement in the durability, there is a method to use the gel with large average particle diameter, but, with this method, the separation performance is insufficient. Besides, there are a method to decrease the amount of whole pore volume of gel body and a method to decrease the amount of fine pore volume without decreasing the amount of whole pore volume. However, whatever method described above may be adopted, it is a present status that the high-speed, the high separation performance and the durability (mechanical strength)

are difficult to be satisfied sufficiently at the same time until now. The great reason why these various techniques have been attempted many times is due to the fact that the development of the gel for organic solvent type GPC capable of corresponding to the requirements aforementioned sufficiently has not been made up to this time.

Even if, for example, with the conventional gel of styrenedivinylbenzene type copolymer used widely for the organic solvent type GPC in general, the mechanical strength (durability), the high separation performance and the high-speed cannot be satisfied simultaneously, though they are satisfied individually. That is, according to the conventional techniques, the realization of the gel for organic solvent type GPC capable of satisfying the high-speed, the high separation performance and the mechanical strength at the same time was difficult.

Dissolving the problems described above the corresponding to these requirements, the invention has accomplished the gel satisfying three themes aforementioned at the same time and the method for the preparation thereof.

SUMMARY OF THE INVENTION

The invention provides a packing material for liquid chromatography comprising monovinyl aromatic monomer and divinyl or polyvinyl aromatic monomer, wherein, in the organic solvent type GPC, exclusion limit molecular weight is not less than $1 \times 10^3$ in terms of standard polystyrene, average particle diameter lies within a range of 0.5 to 50 $\mu$m and the constitution rate of divinyl or polyvinyl aromatic monomer in copoylmer particles is not less than 60% by weight, and a method for the preparation of the packing material for liquid chromatography comprising monovinyl aromatic monomer and divinyl or polyvinyl aromatic monomer, wherein, in the gel permeation chromatography characterized in that, upon the copolymerization of monovinyl aromatic monomer with divinyl or polyvinyl aromatic monomer, suspension polymerization is carried out in a mixed aqueous solution containing organic solvent which dissolves whole monomer containing not less than 60% by weight of divinyl or polyvinyl aromatic monomer in whole monomer by amounts of 50 to 300% by weight of solvent to both monomers and does not dissolve the copolymer of these monomers and radical polymerization initiator, exclusion limit molecular weight is not less than $1 \times 10^3$ in terms of standard polystyrene, average particle diameter lies within a range of 0.5 to 50 $\mu$m and the constitution rate of divinyl or polyvinyl aromatic monomer in copolymer particles is not less than 60% by weight.

BRIEF DESCRIPTION OF THE DRAWING

FIG. 3 is GPC chromatograms of the columns packed with the gels obtained in Comparative example 1, wherein one marked (a) is the GPC chromatogram of the column packed with the gel having Dp 50 of 6.7 $\mu$m and the other marked (b) is the GPC chromatogram of the column packed with the gel having Dp 50 of 4.8 $\mu$m.

FIG. 4 is a GPC chromatogram of the column used in Comparative example 2.

DETAILED DESCRIPTION OF THE INVENTION

Figure 1:
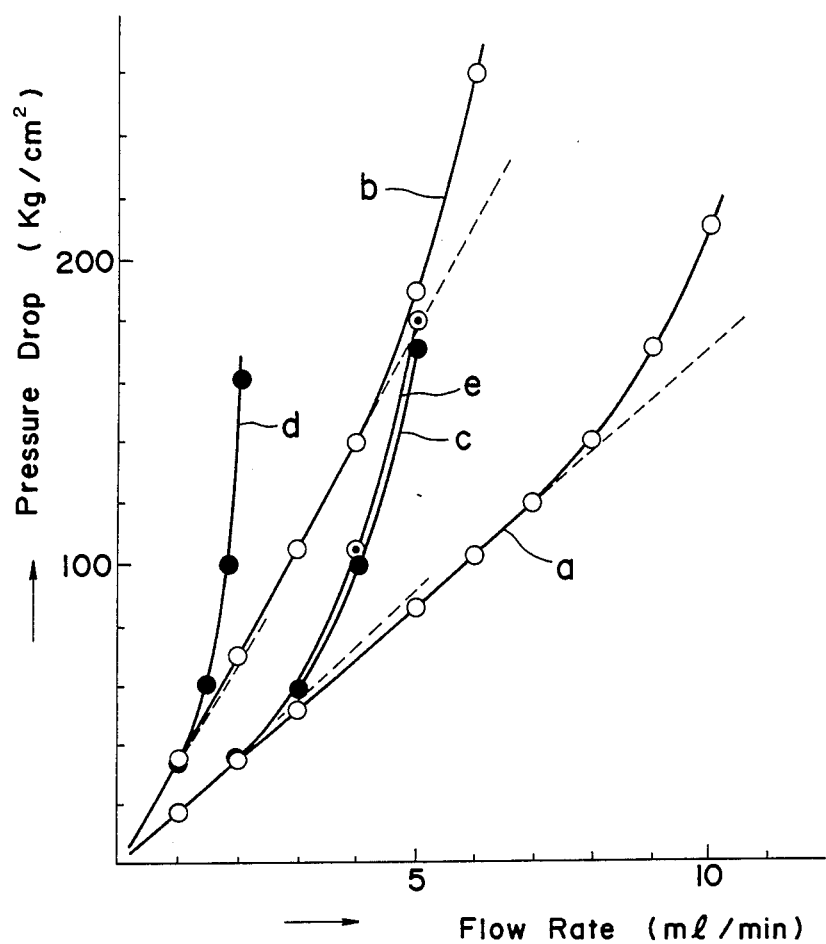
FIG. 1 is a diagram showing the relationship between pressure drop and flow rate on columns packed with the gels obtained in Example 1 and Comparative example 1 and on column used in Comparative example 2, wherein
  a. Gel having the average particle diameter (abbreviated as DP50 hereinafter) of 6.5 $\mu$m obtained in Example 1.
  b. Gel having Dp 50 of 4.0 $\mu$m obtained in Example 1.
  c. Gel having Dp 50 of 6.7 $\mu$m obtained in Comparative example 1.
  d. Gel having Dp 50 of 4.8 $\mu$m obtained in Comparative example 1.
  e. Commercial article used in Comparative example 2.

It is essential that the constitution rate of divinyl or polyvinyl aromatic monomer in the skeleton of gel of the invention is not less than 60% by weight. If the rate of divinyl or polyvinyl aromatic monomer is less than this rate, the gel satisfying the mechanical strength sufficientyl cannot be obtained. Consequently, it is preferable that this rate increases as high as possible. In order to obtain the gel of the invention, it is also essential that divinyl or polyvinyl aromatic monomer is used increasing the purity by means of distillation procedure etc. Moreover, the gel of the invention is necessary for exclusion limit molecular weight to be not less than $1 \times 10^3$ in terms of standard polystyrene. Here, the exclusion limit molecular weight (abbreviated as Mlim hereinafter) represents the maximum molecular weight of molecules possible to enter into the pores of gel and can be determined by plotting the elution volume of the sample to be measured, the molecular weight of which is known, and the molecular weight on a graph after developed the mono-disperse standard polystyrene into the column for GPC packed with the gel for GPC using tetrahydrofuran (abbreviated as THF hereinafter) or chloroform as a eluate. The amount of pore volume means the total volume of the pores in gel and, as this value becomes larger, the column is to have higher separation performance. However, if this value becomes too large inversely, the mechanical, strength decreases. It is necessary that Mlim in the invention is within a range used for the analysis with organic solvent type GPC generally, that is, not less than $1 \times 10^3$, preferably $1 \times 10^3$ to $4 \times 10^8$.

Dp 50 of gel of the invention is ordinarily 0.5 to 50 $\mu$m, preferably 1 to 20 $\mu$m and more preferably 2 to 10 $\mu$m. As Dp 50 becomes smaller, the packing column with higher separation performance can be obtained, but too small Dp 50 is not preferable because of an increase in the pressure drop in column at the time of measurement. Moreover, Dp 50 larger than that within the range aforementioned is also not preferable since the high separation performance is injured.

Monovinyl aromatic monomers used in the invention are styrene, α-methylstyrene, methylvinylbenzene ethylvinylbenzene, monochlorostyrene, vinyl phenol, etc. and it is possible to use them independently or in combination of not less than two. Among these, styrene and ethylvinylbenzene are preferable particularly. Divinyl or polyvinyl aromatic monomers are divinylbenzene, divinyltoluene, trivinylbenzene, divinyl phenol, etc. and, among these, p- or m-divinylbenzene is preferable. Of course, mixtures of p-divinylbenzene with m-divinylbenzene can also be used. And, if the rate of divinyl or polyvinyl aromatic monomer in whole monomer is less than 60% by weight, the gel with high mechanical strength cannot be obtained. Accordingly, the rate of divinyl or polyvinyl aromatic monomer in whole monomer is desirable to be not less than 60% by weight, preferable not less than 80% by weight and more preferably not less than 90% by weight.

The organic solvents used for the preparation of the invention are not particularly confined, if they are soluble into monovinyl aromatic monomer and divinyl or polyvinyl aromatic monomer, do not dissolve the copolymer thereof and are inert organic solvents. For example, aromatic hydrocarbons, ketones, esters, nitro compounds, ethers, alcohols, aliphatic halides, aliphatic hydrocarbons, etc. are mentioned. And, when the gel with relatively small Mlim is aimed, among these, for example, benzene, toluene, ethylbenzene, xylene, ethyl acetate, nitroethane, cyclohexanone, etc. are preferable, in particular, toluene is most preferable.

Also, when the gel with large Mlim is aimed, use of dodecane, nonane, propyl alcohol, n-butyl alcohol, n-amyl alcohol, iso-amyl alcohol, etc. is preferable. These solvents may be used independently or in arbitrary combination of not less than two. The amount of said solvent to be used is within a range of 50 to 300% by weight of whole monomer. If the amount of solvent is less out of this range, the amount of pore volume of the gel decreases resulting in that sufficient separation performance cannot be obtained. On the contrary, if more out of this range, sufficient mechanical strength cannot be obtained to become unsuitable for the high-speed GPC. Therefore, the adoption within a range of 70 to 250% by weight is preferable.

As the radical polymerization initiators, organic peroxides and azo compounds used often conventionally can be used. For example, they are selected approximately from publicly known ones such as benzoyl peroxide, lauryl peroxide, 2,2'-azobisisobutyronitrile, etc. and not confined particularly. The initiator is used in amount used for the suspension polymerization of styrene etc. ordinarily, for example, within a range of 0.1 to 5.0% by weight to whole monomer, but the amount may safely exceed this range. As the suspension stabilizers added to aqueous phase if necessary, water-soluble organic polymers such as polyvinyl alcohol, methylcellulose, etc., phosphates and the like are used. As the case may be, the use of anionic surfactants such as dodecylbenzene sulfonate etc. is possible as the suspension aids. The volume ratio or the weight ratio of oil phase to aqueous phase at the time of polymerization is not restricted particularly and can be carried out under ordinary conditions. As the polymerization temperature, the condition used often ordinarily can be used. For example, the polymerization is carried out within a range of 60° to 100° C. Of course, the temperature can be raised higher out of this range.

As to the time for polymerization, ordinary condition, for example, a range of 10 to 20 hours is employed. Of course, depending on the amount of polymerization initiator or the sort of polymerization initiator, more or less out of the range aforementioned has no difficulty. As to the pressure for polymerization, normal pressure is adopted as on ordinary condition, but the polymerization is possible under the condition of increased or reduced pressure.

In the invention, the GPC measurement for determing various physical properties such as Mlim, pore volume, distribution of pores in the gel, etc., the determination of theoretical plate number (abbreviated as TP hereinafter) of packed column and the measurement of chromatogram of respective samples were made under following conditions.

This is true also in examples and comparative examples.

Column: Made from stainless steel, inner diameter 7.5-7.8 mm, length 30 cm.
Solvent: THF.
Sample: Standard polystyrene 0.05-0.1% THF solution, benzene 0.1% THF solution and epoxy resin 0.1% THF solution.
Flow rate: 1.0 ml/min.
Temperature: 24°-26° C.
Detection: UV254 nm.

The maximum usable flow rate (abbreviated as Max. Flow hereinafter) of gel in the invention can be determined from the relationship between flow rate of measurement and pressure drop in column using the column packed with the gel, and this determination was made under the conditions below. This is true also in examples and comparative examples.

Column; Made from stainless steel, inner diameter 7.5-10.7 mm, length 30 cm.
Solvent; THF.
Flow rate: 0.2-10.0 ml/min.
Temperature: 25° C.

The swelling and contraction property of gel in the invention can be determined from the change of column performance after solvent exchange, when the column was packed with gel using good solvent (for example, THF) and then solvent exchange was conducted using poor solvent (for example, solvent with high polarity).

In following, the invention will be illustrated more concretely based on the examples, but the invention is not confined only to these examples.

EXAMPLE 1

A homogenously mixed solution comprising 60 g of divinylbenzene (mixture of m- and p-isomer, purity 81.6% by weight, most part of the remainder is a mixture of m- and p-isomer of ethylvinylbenzene), 100 g of toluene and 1.5 g of 2,2'-azobisisobutyronitrile and 1000 ml of distilled water containing 1.0% by weight of polyvinyl alcohol and 0.002 g of sodium dodecylbenzene sulfonate were placed into cylindrical flask of 2 l and the inside of flask was stirred with homogenizer in thermostatic bath. Then, this flask was immersed into oil bath maintained at 78° C. to polymerize by heating for 16 hours.

The polymer particles obtained were filtered off and washed sufficiently with hot water and acetone in this order. Then, the particles were dispersed into acetone and the classification was conducted by the classification method utilized the difference in sedimentation velocity to obtain two kinds of gels different in Dp 50.

Figure 2:
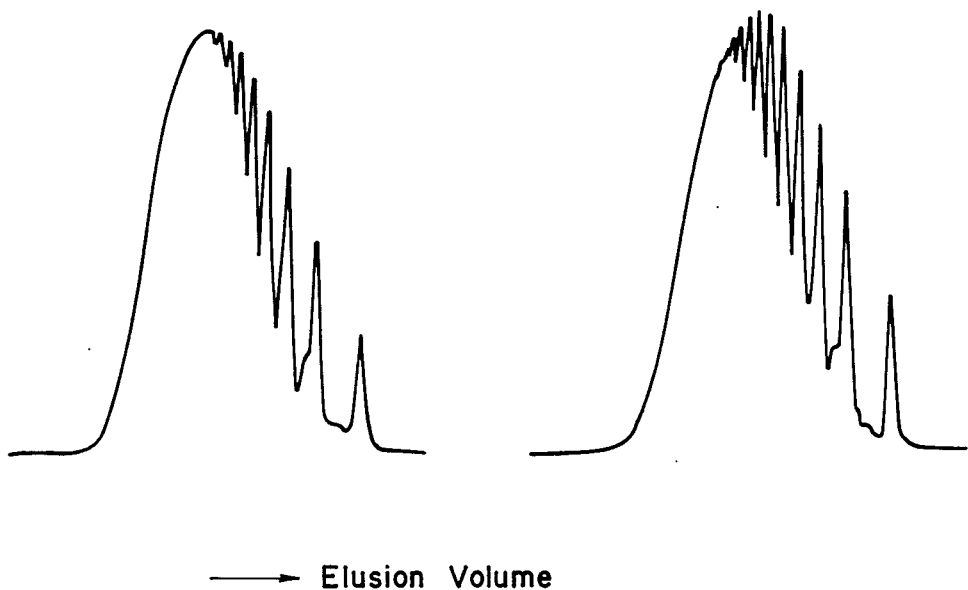
FIG. 2 is GPC chromatograms of the columns packed with the gels obtained in Example 1, wherein one marked (a) is the GPC chromatogram of the column packed with the gel having Dp 50 of 6.5 $\mu$m and the other marked (b) is the GPC chromatogram of the column packed with the gel having Dp 50 of 4.0 $\mu$m.

As a result of the determination with Coulter counter, Dp 50s of these two kinds of gels were 6.5 μm and 4.0 μm, respectively. Moreover, as a result of the determination of this gel with thermal decomposition gas chromatography, the constitution rate of divinylbenzene in the gel was 82% by weight. These gels were dispersed into THF and packed into stainless column having an inner diameter of 7.8 mm and a length of 30 cm using ascent flow. Then, with these columns, THF solution of standard polystyrene (made by Toyo Soda Manufacturing Co., Ltd.), the molecular weight thereof being known, was measured to obtain calibration curves. From data of these calibration curves, Mlims were found to be $5.2 \times 10^4$ equally. TPs calculated by half value width method from chromatograms obtained replacing the sample with benzene (injected 20 μl of 0.1% solution) were 17200 plates/30 cm and 22300 plates/30 cm, respectively. Moreover, the relationships between pressure drops in these columns and flow rates of measurement were plotted on a graph. Plotting was made taking pressure drop on ordinate and flow rate of measurement on abscissa. The relationships are shown in FIG. 1. Results are also shown in Table 1. Further, using these colums, 0.1% solution of bisphenol type epoxy resin (abbreviated as Ep 1004 hereinafter) was injected in amounts of 20 μl as a measurement sample, and the chromatograms of GPC obtained at a flow rate of measurement of 1.0 ml/min using THF as a mobile phase are shown in FIG. 2.

COMPARATIVE EXAMPLE 1

Same procedure was employed wholly as that in Example 1 to obtain two kinds of gels, except that 17.2 g of styrene and 42.8 g of commercial divinylbenzene (mixture of m- and p-isomer, purity 56% by weight, most part of the remainder is a mixture of m- and p-isomer of ethylvinylbenzene) were used. From the measurement results with Coulter counter, Dp 50s of these gels were 6.7 μm and 4.8 μm, respectively. Moreover, from the thermal decomposition gas chromatography, the constitution rate of divinylbenzene in this gel was found to be 41% by weight. These gels were packed into the columns and the calibration curves were made similarly to Example 1. From the calibration curves obtained, Mlims of these gels were $5 \times 10^4$ equally. Moreover, TPs were 16800 plates/30 cm and 19800 plates/30 cm, respectively. Furthermore, GPC chromatograms of Ep 1004 are shown in FIG. 3. And further, the relationships between pressure drops in these columns and flow rates of measurement are shown in FIG. 1. These results are also shown in Table 1. The Max. Flows of these columns were 2.6 ml/min with the column packed with gel having Dp 50 of 6.7 μm and 1.2 ml/min with the column packed with gel having Dp 50 of 4.8 μm. Therefore, these gels exhibited lower mechanical strength compared with those in cases of colums packed with the gels obtained in Example 1.

EXAMPLE 2

Same procedure was employed wholly as that in Example 1 to obtain two kinds of gels, except that 10 g of styrene ans 50 g of divinylbenzene (p-divinylbenzene, purity 98.3% by weight) were used. From the measurement results with Coulter counter, Dp 50s of these gels were 6.6 μm and 4.1 μm, respectively. Moreover, from thermal decomposition gas chromatography, the constitution rate of divinylbenzene in this gel was found to be 81% by weight. These gels were packed into the colums to determine various physical properties similarly to Example 1. As a result, Mlim was $4.9 \times 10^4$, TPs were 17000 plates/30 cm and 22000 plates/30 cm and Max. Flows were 7.4 ml/min and 4.0 ml/min, respectively. Therefore, these gels exhibited equal mechanical strengths as those in cases of columns packed with the gels obtained in Example 1.

COMPARATIVE EXAMPLE 2

Using commercial column packed with the gel having styrenedivinylbenzene as a skeleton, various physical properties were determined by the similar measurement methods to those in Example 1, which are shown in Table 1. The constitution rate of divinylbenzene in the gel determined by means of thermal decomposition gas chromatography was 34% by weight. Moreover, GPC chromatogram of Ep 1004 is shown in FIG. 4. The relationship between pressure drop in the column and flow rate of measurement is shown in FIG. 1. These results are shown in Table 1. Max. Flow was 2.0 ml/min, from which it can be seen that the mechanical strength of this gel is considerably low compared with that of gels in Example 1.

COMPARATIVE EXAMPLE 3

Using commercial column packed with the gel having styrenedivinylbenzene as a skeleton, various physical properties were determined by the similar measurement methods to those in Example 1, which are shown in Table 1. The constitution rate of divinylbenzene in the gel obtained by means of thermal decomposition gas chromatography was 32% by weight. Moreover, Max. Flow were 2.0 ml/min (This value is one obtained with the column of inner diameter of 10.7 mm. When converting into one with the column of inner diameter of 7.8 mm, it becomes to about 1.1 ml/min). Therefore, it was found that the mechanical strength of this gel was extremely low.

EXAMPLE 3

Same procedure was employed wholly as that in Example 1, except that a homogenously mixed solution comprising 60 g of divinylbenzene (p-divinylbenzene, purity 98.3% by weight), 120 g of toluene and 2 g of benzoyl peroxide were used. From the measurement results with Coulter counter, Dp 50s of two kinds of gels obtained were 6.5 μm and 3.9 μm, respectively. Moreover, from the measurement results with thermal decomposition gas chromatography, the constitution rate of divinylbenzene in this gel was 98% by weight. These gels were packed into the columns by the same procedure as that in Example 1 and the measurements were made, respective results of which are shown in Table 1. From these results, Mlims were $5.2 \times 10^4$ equally and Max. Flows were 8.8 ml/min and 4.6 ml/min, respectively. The mechanical strength are improved to extents higher than those of gels in Example 1 and improved exceptionally compared with those in Comparative example 1 through 3.

EXAMPLE 4

Same procedure was employed wholly as that in Example 1, except that a homogenously mixed solution comprising 60g of divinyltoluene (2,4-divinyltoluene, purity 95% by weight), 120 g of toluene and 2 g of benzoyl peroxide were used. From the measurement results with Coulter counter, Dp 50s of two kinds of gels obtained were 6.6 μm and 4.1 μm, respectively.

Moreover, from thermal decomposition gas chromatography, the constitution rate of this gel was 94% by weight. These gels were packed into the columns by the same procedure as that in Example 1 and measurement were made. Results of various physical properties obtained are shown in Table 1. As seen from these results, Mlims were $5.0 \times 10^4$ equally and Max. Flow were 8.4 ml/min and 4.4 ml/min, respectively.

EXAMPLE 5

Figure 5:
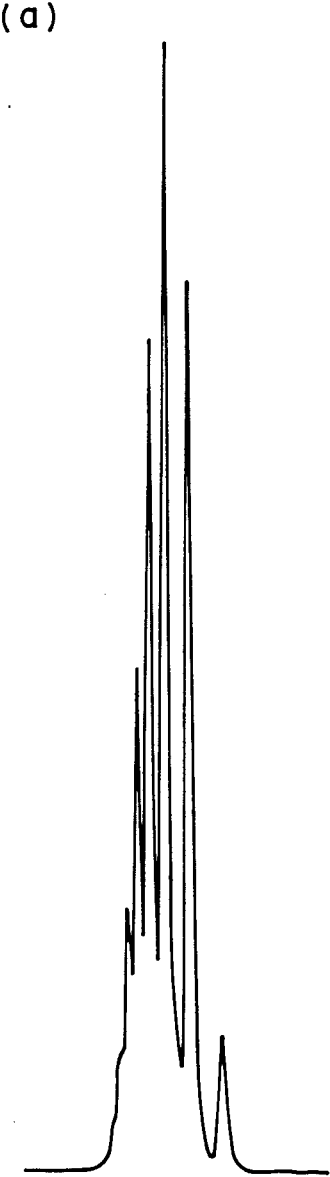
FIG. 5 is GPC chromatograms of the columns packed with the gels obtained in Example 5, wherein one marked (a) is the GPC chromatogram of the column packed with the gel having Dp 50 of 4.8 $\mu$m and the other marked (b) is the GPC chromatogram of the column packed with the gel having Dp 50 of 2.7 $\mu$m.
Figure 5:
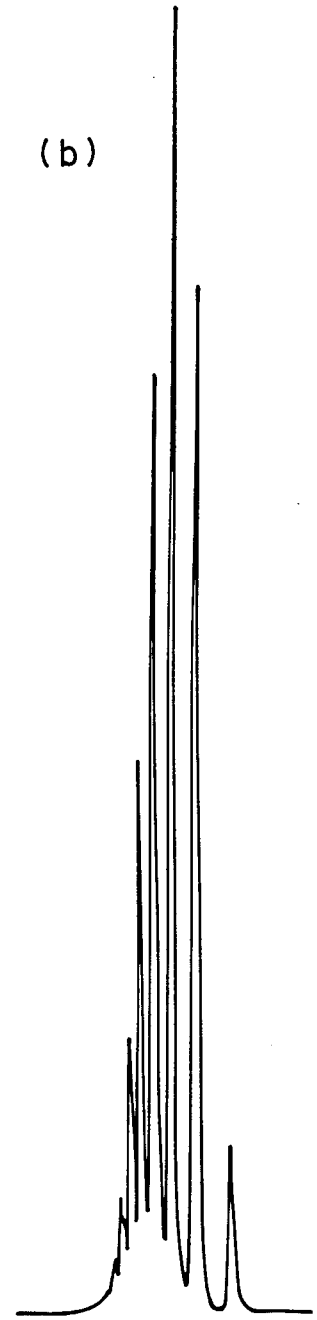

Same procedure was employed wholly as that in Example 1, except that a homogenously mixed solution comprising 60 g of divinylbenzene (p-divinylbenzene, purity 98.3% by weight), 70 g of toluene and 4.8 g of benzoyl peroxide were used, and two kinds of gels were obtained, Dp 50s thereof being 4.8 μm and 2.7 μm, respectively, from the measurement results with Coulter counter. As a result of the analysis of this gel by thermal decomposition gas chromatography, the constitution ratio of divinylbenzene in the gel was found to be 98% by weight. Moreover, these gels were packed into the columns to measure respective performances. TPs were 23500 plates/30 cm and 32000 plates/30 cm, respectively, Mlims were $6 \times 10^3$ equally and Max. Flows were more than 10 ml/min and 4 ml/min. These results are shown in Table 1. Furthermore, GPC chromatograms obtained by injecting 20 μl of 0.1% solution of standard polystyrene (made by Toyo Soda Manufacturing Co., Ltd., trade name "TSK A-300") as a measurement sample at a flow rate of measurement of 1 ml/min using THF as a mobile phase are shown in FIG. 5.

COMPARATIVE EXAMPLES 4–6

Figures 6, 7, 8:
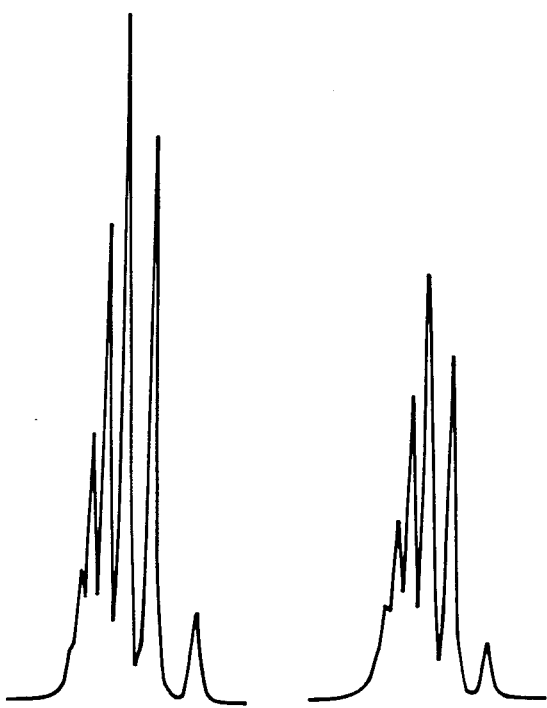
FIG. 6, FIG. 7 and FIG. 8 are GPC chromatograms of the columns used in Comparative example 4, 5 and 6, respectively.

Using three kinds of commercial columns
Column A: Inner diameter 7.8 mm, length 30 cm,
Column B: Inner diameter 10.7 mm, length 30 cm,
Column C: Inner diameter 7.8 mm, length 30 cm,
packed with the gel having styrene-divinylbenzene as a skeleton, respective values of physical properties were determined by the same measurement methods as those in Example 1, which are shown in Table 1. Moreover, GPC chromatograms obtained by injecting standard polystyrene (made by Toyo Soda Manufacturing Co., Ltd. trade name "TSK A-300") into each column at a flow rate of measurement of 1 ml/min (linear velocity in column B was adjusted to 1.8 ml.min in order to make same as that in column A and column C) using THF as a mobile phase are shown in FIGS. 6 through 8. From the results shown in Table 1, Max, Flow of these columns were 1.5 ml/min, 2.0 ml/min and 3.0 ml/min, respectively. The strengths are extremely low compared with the gels in cases of columns packed with the gels in Example 5. Moreover, these gels were drawn out from the columns and analyzed the constitution rates of divinylbenzene in gels by means of thermal decomposition gas chromatography. In consequence, the constitution rates were 21% by weight with the gel in column A, 26% by weight with the gel in column B and 33% by weight with the gel in column C.

TABLE 1

| | Constitution rate of divinyl aromatic monomer in gel (% by weight) | TP (plates/30 cm) | Mlim | Max-Flow (ml/min) | Dp50 (μm) |
|---|---|---|---|---|---|
| Example 1 | 82 | 17200 | $5.2 \times 10^4$ | 7.5 | 6.5 |
| | " | 22300 | " | 4.0 | 4.0 |
| Comparative example 1 | 41 | 16800 | $5.0 \times 10^4$ | 2.6 | 6.7 |
| | " | 19800 | " | 1.2 | 4.8 |
| Example 2 | 81 | 17000 | $4.9 \times 10^4$ | 7.4 | 6.6 |
| | " | 22000 | " | 4.0 | 4.1 |
| Comparative example 2 | 34 | 17000 | " | 2.0 | 6.5 |
| Comparative example 3 | 32 | 18900 | $2.1 \times 10^4$ | 2.0 (1.1) | 6.8 |
| Example 3 | 98 | 17000 | $5.2 \times 10^4$ | 8.8 | 6.5 |
| | " | 23200 | " | 4.6 | 3.9 |
| Example 4 | 94 | 16900 | $5.0 \times 10^4$ | 8.4 | 6.6 |
| | " | 21500 | " | 4.4 | 4.1 |
| Example 5 | 98 | 23500 | $6.0 \times 10^3$ | 10< | 4.8 |
| | " | 32000 | " | 4.0 | 2.7 |
| Comparative example 4 (Column A) | 21 | 22700 | $5.0 \times 10^3$ | 1.5 | 5.8 |
| Comparative example 5 (Column B) | 26 | 20500 | $9.0 \times 10^3$ | 2.0 (1.1) | 8.1 |
| Comparative example 6 (Column C) | 33 | 17300 | $1.4 \times 10^4$ | 3.0 | 8.1 |

EXAMPLE 6

The gel obtained in Example 1 was further classified to obtain a gel of 8 to 12 μm. This gel was wet packed into a stainless column having an inner diameter of 7.5 mm and a length of 30 cm using THF solvent. Into the sample in this column were injected 20 μl of 0.1% solution of benzene using THF as a mobile phase and TP was determined by half value width method to find 10500 plates/30 cm. Then, through this column was passed acetone amounting three times by volume of inner volume of column at a flow rate of 1.0 ml/min to exchange solvent to acetone and the column was allowed to stand for a week in thermostatic chamber (25° C.). After a week, using acetone as a mobile phase, 20 μl of 0.1% solution of benzene were injected into the sample and TP was determined by half value width method to find 9900 plates/30 cm. Following this, through this column was passed dimethylformamide (abbreviated as DMF hereinafter) amounting three times by volume of inner volume of inner volume of column at a flow rate of 1.0 ml/min to exchange solvent to DMF and the column was allowed to stand for a month in thermostatic chamber (25° C.). After a month, using DMF as a mobile phase, 20 μl of 1% solution of acetone were injected into the sample and TP was determined by half value width method to find 12000 plates/30 cm. Further, through this column was passed ethyleneglycol monomethyl ether (abbreviated as EGMME hereinafter) amounting three times by volume of inner volume of column at a flow rate of 1.0 ml/min to exchange solvent to EGMME and the column was allowed to stand for a month in thermostatic chamber (25° C.). After a month, using EGMME as a mobile phase, 20 μl of 1% solution of acetonitrile were injected into the sample and TP was determined by half value width method to find 13800 plates/30 cm. Furthermore, with this column, running (continuing night and day) over 100 hours was carried out at a flow rate of 1.5 ml/min using EGMME as a passing-through solvent. After the running, TP determined was 13200 plates/30 cm and the lowering of performance due to the running was not recognized. Results are shown in Table 2.

COMPARATIVE EXAMPLE 7

Using commercial column (Mlim $4.9 \times 10^4$, inner diameter 7.5 mm, length 30 cm) packed with the gel having styrene-divinylbenzene as a skeleton, the performance change of column due to the solvent exchange was investigated by the same method as that in Example 6. As a result, the lowering of performance occurred wherein the column having had TP of 11000 plates/30 cm in THF determination showed TP of 3000 plates/30 cm in the determination with acetone after a week through the solvent exchange to acetone. And next, when solvent was exchanged from acetone to EGMME with this column, Top off was formed at the entrance side of the column and the lowering of performance was caused violently. Results are shown in Table 2.

EXAMPLE 7

Same procedure was employed wholly as that in Example 1 to obtain the gel, except that a homogenously mixed solution comprising 90 g of divinylbenzene (p-divinylbenzene, purity 98.3% by weight), 35 g of toluene, 90 g of n-amyl alcohol and 2 g of 2,2'-azobisisobutyronitrile and 1000 ml of distilled water containing 0.6% by weight of polyvinyl alcohol and 0.001 g of sodium dodecylbenzene solfonate were used. The gel was classified to a gel of 8 to 12 μm by the use of wet sedimentation classification method. According to the normal method, this gel was wet packed into a stainless column having an inner diameter of 7.5 mm and a length of 30 cm using THF solvent. To the sample in this column was applied standard polystyrene using THF as a mobile phase to make the calibration curve. From this calibration curve, Mlim was found to be $5.5 \times 10^5$. Moreover, when 20 μl of 0.1% solution of benzene were injected into the sample and TP was determined by half value width method, it was 11700 plates/30 cm. Through this column was passed acetone amounting three times by volume of inner volume of column at a flow rate of 1.0 ml/min to exchange solvent and the column was allowed to stand for a week in thermostatic chamber (25° C.). After a week, 20 μl of 0.1% solution of benzene were injected into the sample using acetone as a mobile phase and TP was determined by half value width method to find 10800 plates/30 cm. Following this, DMF amounting three times by volume of inner volume of column was passed through at a flow rate of 1.0 ml/min to exchange solvent and the column was allowed to stand for a month in thermostatic chamber (25° C.). After a month, 20 μl of 1% solution of acetona were injected into the sample using DMF as a mobile phase and TP was determined by half value width method to find 13200 plates/30 cm. And next, EGMME amounting three times by volume of inner volume of column was passed through at a flow rate of 1.0 ml/min to exchange solvent and afterwards, the column was allowed to stand for a month in thermostatic chamber (25° C.). After a month, 20 μl of 1% solution of acetonitrile were injected into the sample using EGMME as a mobile phase and TP was determined by half value width method to find 14200 plates/30 cm. Further, with this column, running (continuing night and day) was carried out over 100 hours at a flow rate of 1.5 ml/min using EGMME as a solvent, and TP after running was determined to find 14500 plates/30 cm. The lowering of performance of the column was not recognized at any rate. Results are shown in Table 2.

COMPARATIVE EXAMPLE 8

Using commercial column (Mlim $6 \times 10^5$, inner diameter 7.5 mm, length 30 cm) packed with the gel having styrene-divinylbenzene as a skeleton, test of solvent exchangeability was carried out similarly to Comparative example 7. Although the lowering of performance was not seen wherein the column having had TP of 10200 plates/30 cm in THF determination showed TP of 10000 plates/30 cm in the determination after the solvent exchange to acetone, when exchanged to DMF solvent, gap was formed at the entrance side of the column on a week after the exchange to cause the lowering of performance and the column became impossible to use. Results are shown in Table 2.

TABLE 2

|  | Constitution rate of divinyl aromatic monomer in gel (% by weight) | Mlim | TP (plates/30 cm) | | | |
| --- | --- | --- | --- | --- | --- | --- |
|  |  |  | THF | Acetone | DMF | EGMME |
| Example 6 | 82 | $5.2 \times 10^4$ | 10500 | 9900 | 12000 | 13800 |
| Comparative example 7 | 34 | $4.9 \times 10^4$ | 11000 | 3000 | — | Remarkable lowering of performance |
| Example 7 | 98 | $5.5 \times 10^5$ | 11700 | 10800 | 13200 | 14200 |
| Comparative example 8 | 34 | $6.0 \times 10^5$ | 10200 | 10000 | Remarkable lowering of performance | — |

As evident from the illustration above, the gels of the invention have the characteristics that they have the mechanical strengths never found hitherto and the degrees of swelling and contraction are extremely small to various solvents. Moreover, in accordance with the invention. (a) The preparation of the gel for high-speed GPC satisfying three themes of high separation performance, high-speed analysis and durability simultaneously has become very easy. (b) Conventionally, Dp 50 of the gel in the column for high-speed GPC used for the separation and analysis of organic oligomers was about 5 μm. However, according to the invention, the preparation of the column for high-speed GPC with fine particles of less than 5 μm has become easy and the supply of the column for high-speed GPC with high separation performance being very excellent and never seen until now has become possible. Consequently, the time necessitated for the analysis at present can be shortened to a half, nevertheless equal separation performance is to be obtained, (c) Extremely small degree of swelling and contraction makes it possible to exchange to various solvents with one column packed. Therefore, sorts of the samples for the measurement have been spread and the application scope for the measurement has become wide.

(d) Since the lowering of performance is difficult to occur even under various hard conditions, the durability (life) has been extremely extended and the reproducibility of the measurement has also been improved.

As described, the gels of the invention are extremely excellent and useful in the fields concerned and the industrial significance of the invention is very great.

What is claimed is:

1. A method for the preparation of the packing material for liquid chromatography comprising a copolymer of a monovinyl aromatic monomer and a divinyl or polyvinyl aromatic monomer, wherein, in gel permeation chromatography characterized in that, upon the copolymerization of monovinyl aromatic monomer with divinyl or polyvinyl aromatic monomer, suspension polymerization is carried out in a mixed aqueous solution containing organic solvent which dissolves whole monomer containing not less than 60% by weight of divinyl or polyvinyl aromatic monomer in whole monomer by amounts of 50 to 300% by weight of solvent to both monomers and does not dissolve the copolymer of these monomers and radical polymerization initiator, exclusion limit molecular weight is not less than $1 \times 10^3$ in terms of standard polystyrene, average particle diameter lies within a range of 0.5 to 50 m and the constitution rate of divinyl or polyvinyl aromatic monomer in copolymer particles is not less than 60% by weight.

2. A packing material for liquid chromatography, comprising a copolymer of a monovinyl aromatic compound and a divinyl or polyvinyl aromatic compound, wherein said divinyl or polyvinyl aromatic compound comprises an amount not less than 60 wt. % of said copolymer, the exclusion limit molecular weight in gel permeation chromatography is not less than $1 \times 10^3$ in terms of standard polystyrene, and the average particle diameter lies within a range of 0.5 to 500 μm.

3. The packing material of claim 2, wherein said exclusion limit molecular weight in gel permeation chromatography is $1 \times 10^3$ to $4 \times 10^8$ in terms of standard polystyrene.

4. The packing material of claim 2, wherein the average particle diameter lies within a range of 1 to 10 μm.

5. The packing material of claim 2, wherein the average particle diameter lies within a range of 2 to 10 μm.

6. The packing material according to claim 2, wherein said divinyl or polyvinyl aromatic compound is present in an amount not less than 80 wt. % to said copolymer.

7. The packing material of claim 2, wherein said divinyl or polyvinyl aromatic compound is present in an amount of not less than 90 wt. % to said copolymer.

8. The packing material of claim 2, wherein said divinyl or polyvinyl aromatic compound is para- or meta-dinvinylbenzene.

9. The packing material of claim 2, wherein said monovinyl aromatic compound is styrene or ethylvinylbenzene.

* * * * *